United States Patent
Giles et al.

(10) Patent No.: US 12,022,802 B2
(45) Date of Patent: *Jul. 2, 2024

(54) TRAINING AID

(71) Applicants: THE UNITED STATES OF AMERICA AS REPRESENTED BY THE FEDERAL BUREAU OF INVESTIGATION, DEPARTMENT OF JUSTICE, Washington, DC (US); AUBURN UNIVERSITY, Auburn, AL (US)

(72) Inventors: Kathleen Giles, Washington, DC (US); Thomas Craig Angle, Auburn, AL (US); Lowell Paul Waggoner, Auburn, AL (US); Thomas Passler, Auburn, AL (US); Terrence Fischer, Auburn, AL (US)

(73) Assignees: The United States of America as Represented by the Federal Bureau of Investigation, Department of Justice, Washington, DC (US); Auburn University Office of Technology Transfer, Auburn, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/325,290

(22) Filed: May 30, 2023

(65) Prior Publication Data

US 2024/0057557 A1 Feb. 22, 2024

Related U.S. Application Data

(62) Division of application No. 17/081,441, filed on Oct. 27, 2020, now Pat. No. 11,696,568.

(Continued)

(51) Int. Cl.
*A01K 15/02* (2006.01)

(52) U.S. Cl.
CPC .................................... *A01K 15/02* (2013.01)

(58) Field of Classification Search
CPC ...... A01K 15/00; A01K 15/02; Y10S 119/905; B01F 21/02
See application file for complete search history.

(56) References Cited

U.S. PATENT DOCUMENTS

| 4,725,575 A | 2/1988 | Frihart et al. |
| 4,753,389 A | 6/1988 | Davis |

(Continued)

OTHER PUBLICATIONS

Bazinet (2017)"Pan-genome and phylogeny of Bacillus cereus sensu lato," BMC Evolutionary Biology17,176:1-16.

(Continued)

*Primary Examiner* — Trinh T Nguyen
(74) *Attorney, Agent, or Firm* — Perilla Knox & Hildebrandt LLP (57) ABSTRACT

Provided herein are methods of making a training aid for detecting a biohazard, and related devices and methods of using the device, including a canine training aid. The devices are made by positioning a polymer layer in proximity and physically separated from a biological material, so that volatile organic compounds contact and bind or infuse the polymer layer. The device is made render-safe by inactivating the infused polymer layer, such as by heating to a temperature sufficient to inactivate biological agents on or in the analyte-infused polymer layer. The device can be stored in a substantially air-tight configuration for subsequent use in training, such as canine and/or or artificial detectors.

20 Claims, 5 Drawing Sheets

Related U.S. Application Data (60) Provisional application No. 63/036,738, filed on Jun. 9, 2020, provisional application No. 62/926,725, filed on Oct. 28, 2019.

(56) References Cited

U.S. PATENT DOCUMENTS

| | | |
|---|---|---|
| 5,482,678 A | 1/1996 | Sittler |
| 5,765,751 A | 6/1998 | Joshi |
| 7,146,934 B1 | 12/2006 | Staley |
| 9,125,396 B1 | 9/2015 | Walizer |
| 10,154,968 B2 | 12/2018 | Ravis et al. |
| 10,729,102 B2 | 8/2020 | Linssen et al. |
| 2001/0047771 A1 | 12/2001 | Bulanda |
| 2002/0058595 A1 | 5/2002 | Kaiser |
| 2003/0068955 A1 | 4/2003 | Vick |
| 2005/0148479 A1 | 7/2005 | Barthel et al. |
| 2008/0295783 A1 | 12/2008 | Furton et al. |
| 2012/0210948 A1 | 8/2012 | Furton et al. |
| 2014/0021270 A1 | 1/2014 | MacCrehan et al. |
| 2016/0081302 A1 | 3/2016 | Hare |
| 2017/0367298 A1 | 12/2017 | Maughan |
| 2018/0027771 A1 | 2/2018 | Wachter et al. |
| 2020/0262629 A1 | 8/2020 | Steed |
| 2020/0344978 A1 | 11/2020 | Maughan |

OTHER PUBLICATIONS

Harcourt et al. (Jun. 2020) "Severe Acute Respiratory Syndrome Coronavirus 2 from Patient with Coronavirus Disease, United States," Emerg Infect Dis.26(6):1266-1273.

Radnedge et al.(2003) "Genome Differences That DistinguishBacillus anthracis from Bacillus cereus and Bacillus thuringiensis," Applied and Environmental Microbiology69(5):2755-2764.

"5.8 Methods of sterilization," (Nov. 2019)The International Pharmacopoeia (Ninth Edition),3 pages [ Accessed Jun. 3, 2020].

TRAINING AID

CROSS-REFERENCE TO RELATED APPLICATIONS

This application is a divisional of U.S. patent application Ser. No. 17/081,441 filed Oct. 27, 2020, which claims the benefit of priority to U.S. Provisional Patent Application Nos. 62/926,725, filed Oct. 28, 20191, and 63/036,738, filed Jun. 9, 2020, which are hereby incorporated by reference in their entirety.

STATEMENT OF GOVERNMENT INTEREST

The inventions described herein were invented by employees of the United States Government and thus, may be manufactured and used by or for the U.S. Government for governmental purposes without the payment of royalties.

BACKGROUND OF THE INVENTION

Law enforcement has a need for field detection of biological agents and toxins that may be weaponized, including those that are characterized as Biological Select Agents and Toxins (BSAT). The U.S. Government has determined that BSAT have the potential to pose a severe threat to the public, animal and/or plant health, or to animal or plant products and thus possession, use, and transfer are restricted to select agent laboratories that are registered with the U.S. Centers for Disease Control and Prevention (CDC) or the U.S. Department of Agriculture (USDA). Registered facilities are regulated for compliance with a number of policies and procedures designed to maintain the security of these materials. Furthermore, there is a need in the art for reliable and efficient detection of biological agents that are associated with a pandemic, or at risk of developing into a pandemic, including those agents that affect public health, agriculture or animal health. Provided herein are methods of making training aids, and related methods of using such aids, and various training aids, including in the context of animal (including canine) training and device calibration, that address the end need for field detection of such agents in a safe, reliable and cost-effective manner.

Canine detection is currently the most reliable means of field detection of biological agents and toxins, surpassing current technological capabilities of handheld instruments. Canines are used as a screening tool for law enforcement to help direct forensic personnel to locations to be processed so that confirmatory testing can be conducted in a laboratory. Canines who meet the criteria for detection work are typically taught in a secure training facility to detect hazardous substances such as explosives, narcotics, and chemicals by using actual material combined with a physical barrier. This training and maintenance cannot take place in the canine's operational environment, such as an active airport or train station, because these materials are highly volatile and/or dangerous to human health. Studies show that canines who are taught in this environment may be less vigilant in their operational work environment due to not regularly encountering, and thus being rewarded less for finding, a target.

BSAT cannot be used in the field for training due to the inherent dangers presented by the BSAT to human, animal, or plant health during preparation, transportation, and training. The present invention addresses this problem by developing a training aid to capture the volatile organic compounds (VOCs) of a biological agent or toxin and then rendering the training aid sterile by performing a sterilization step on the training aid, including for microbial VOCs (MVOCs) generated by a bacteria, virus and related infection thereof.

Vapor capture and release systems are generally known in the art. U.S. Pat. Pub. No. 2014/0021270 (MacCrehan et al.), for example, describes storing and releasing target agents with a polymeric substrate. That system, however, is fundamentally incompatible for safe and reliable canine training with biological agents or toxins generated by microorganisms as there is a risk that active agents remain associated with those systems. In other words, those systems are not fairly described as having been rendered safe. The systems and methods provided herein, in contrast, ensure that the canine training aid is rendered safe so that there is no risk from biological agents or toxins associated with training canines, without adversely impacting canine training efficacy.

BRIEF SUMMARY OF THE INVENTION

The invention provides methods, and related devices, that have been rendered safe for device calibration and animal training, such as canine training, to detect biological agents, such as bacteria and/or viruses, and more generally, toxins. This is achieved by infusing a polymer with VOCs released by a material to-be-detected ("target agent") by the canine (e.g., a biological agent or toxin) and then heating the VOC-infused polymer to provide a rendered-safe training aid. The heating ensures that the VOC-infused polymer is sterilized so that there is no risk to the public, trainer, canine or the surrounding environment during training. Furthermore, the canine can be kept engaged during operational activity by selective use and placement of the training aid for periodic canine reward. This ensures the canine remains actively engaged for longer time periods, and has a number of functional benefits, including increasing effectiveness and detection, increasing effective time on-site and overall vigilance. Without such positive rewards, even the best of canines are prone to boredom, associated distraction, and decreased effectiveness.

The methods are based, at least in part, on the discovery that the canine training aid can be effectively sterilized without adversely impacting the VOCs "stored" by the polymer in the training aid with respect to canine detection. Examples of sterilizing include via heating, such as to a temperature that is greater than about 125° C. for a time period sufficient to inactivate agents, including biological agents, that may reside on or in the polymer and that pose a health or environmental risk. Generally, as the temperature increases, the time period required to achieve sterilization decreases. For example, at an elevated temperature of 140° C., the time the training aid is exposed to that temperature may be in the approximately 1 hour range. For a temperature of 125° C., the time may be greater than 1 hour, such as 2 hours or more. The time, temperature and/or pressure are agent-specific, and are determined by scientifically valid methodology, including published methods used by laboratory subject matter experts. For example, LD50 to LD100 assays, where organism viability is empirically determined as a function of time, temperature and/or pressure.

The invention provided herein is compatible with a wide range of temperatures, so long as the temperature is sufficiently high to achieve a render-safe aid, but not so high that the polymer-stored VOCs are adversely impacted to make the canine training ineffective. For example, the maximum temperature may be selected to be below 200° C., so that the range of maximum temperature for the heating of the VOCs-infused polymer is between about 130° C. and 150° C. The temperature is preferably selected to avoid undue loss of VOCs from the polymer and long-term damage to the polymer integrity, including a PDMS substrate.

The heating may be provided by autoclaving the VOCs-infused polymer. This provides increased sterilization capability through control of both temperature and pressure, as well as steaming and duration. Pre- and post-sterilization studies show that the sterilization process does not adversely impact the canine's ability to detect the underlying agent. This allows canines to be trained on actual odor of a target biological agent or toxin without exposing the canine or handler to the target itself. Of course, while the examples provided herein are directed to canine training, the methods and devices described herein may be used to train any animal or machine to identify the associated biological material and/or toxin because the training aid is rendered-safe and has been established to be reliably associated with the underlying biological agent and/or toxin.

More generally, the methods provided herein rely on inactivating agents to ensure the resultant training aid is rendered-safe, with applicability for biological agents and/or toxins. Accordingly, various other inactivation protocols may be used in the method, besides temperature increase. For example, besides heating by steam heating (e.g., autoclave) or dry heating, electromagnetic radiation of a specific wavelength may be used, including wavelengths where damage is done to biological material such as DNA and RNA and other microorganism components, such as ionizing radiation or UV radiation. The wavelength is selected to have a penetration depth in the polymer that is greater than or equal to the maximum depth of the biological agent in the polymer.

Filtering may also be used to ensure that no agent is able to come into contact with the polymer, including toxin or a biological agent. The filtering may be prior to the capturing (e.g., "charging"), such as by filtering culture media used to "culture" the biological agent that is a microorganism, such as a bacteria or a virus. For bacteria, the filter generally corresponds to a 0.2 µm size filter. Filtering generally is not used for a virus because the size of the virus is so small that effective filtering can be challenging.

Provided herein is a method of making a canine training aid for detecting a biohazard. The method may comprise the steps of: providing a material that releases one or more analytes; positioning a polymer layer in proximity and physically separated from the material, wherein the one or more analytes are capable of release from the material and contact with the polymer layer; capturing the one or more analytes that contact the polymer layer to obtain an analyte-infused polymer layer; heating the analyte-infused polymer layer to a temperature sufficient to inactivate agents on or in the analyte-infused polymer layer and to render-safe the analyte-infused polymer layer; and storing the render-safe analyte-infused polymer layer in a substantially air-tight canister with a removable lid for subsequent use in canine training. The biohazard may correspond to a biological material that is a microorganism, such as a bacteria or virus, or a toxin. In this manner, canines can be efficiently, safely and routinely trained to detect the presence of one or more bacterial and/or viral agents. As newly emergent microorganisms or toxins become a risk, canines are able to be rapidly trained and deployed using the training-aids described herein that are matched to the newly emergent target. This has immediate practical applications for efficient field detection of infectious agents or toxins, including in high-risk areas such as airports, schools and businesses, such as theaters, sporting events, and concerts, as well as at borders and ports of entry for detection of microorganisms in food and agriculture products, and domestic or wild animal populations. The material can be a biological material and the agent can be a biological agent.

The methods and devices provided herein may be used to detect a biological agent and/or a toxin. Although a focus of the examples section relates to a biological agent, the devices and methods can relate, in a similar fashion, to toxins that can impact health and safety of persons, animals, plants and the environment. The common mechanism for the various agents are that they release VOCs that are captured in the polymer, and the VOCs-infused polymer is subsequently subject to a render-safe challenge to ensure the infused polymer is safe for subsequent handling and use without adversely impacting training, such as canine training. The render-safe step is referred to as an "inactivating" step that degrades or otherwise impacts the underlying agent without adversely impacting the infused polymer's ability for subsequent training.

The polymer layer may be positioned in an inner volume defined by a shallow and seamless canister, including wherein the removable lid is configured to cover the canister inner volume having the polymer layer in a substantially air-tight configuration.

The method may further comprise the step of heating the polymer layer and a canister before the positioning step to remove unwanted volatile organic compounds associated with the polymer or the canister. In this manner, even before the polymer layer is introduced to the biological agent or toxin the polymer layer and related canister and lid, have been treated to remove at least substantial amounts of inherent VOCs that could otherwise interfere with the attendant reliability (e.g., sensitivity and/or specificity) achieved with the training aid.

The heating step may further comprise heating the analyte-infused polymer layer and canister, including separately or with the polymer or pre-polymer already positioned in the canister.

The heating step may comprise autoclaving the polymer layer to an elevated temperature and pressure to sterilize the analyte-infused polymer layer. The autoclaving may comprise steam-sterilization of the analyte-infused polymer layer.

Methods described herein are compatible with a range of heating regimens, depending on the application of interest, including tailored to the biological material of interest. The hearting may comprise introducing the analyte-infused polymer layer to a temperature that is between 125° C. and 155° C. for a time period of between 0.5 hours and 1.5 hours.

After the heating and storing step, the training aid is used to train a canine to detect the biological agent at a sensitivity of at least 85% and/or a specificity of at least 90%.

The method may, prior to the polymer layer positioned in the inner volume, further comprise the steps of: separating the lid from the canister; baking the separated lid and canister at 140° C.-160° C. for at least three hours; cooling the separated lid and canister; and sealing the lid to the canister until the canister is ready to receive a pre-polymer or the polymer layer.

The method is compatible with a range of polymers. For example, the polymer layer may comprise polydimethylsiloxane (PDMS) or is PDMS. The PDMS layer may have a depth that is greater than or equal to 2 mm and less than or equal to a canister inner volume depth. Any polymer may be used that is able to capture one or more analytes from the biological material and withstand the inactivating step, such as by a heating step.

Any of the methods may further comprise the step of removing unwanted polymer impurities by heating the polymer layer to at least 125° C. for at least one hour.

The method may further comprise the steps of: providing at least one microorganism and/or toxin that releases an analyte comprising a volatile organic compound (VOC); suspending the polymer layer over the biological agent for a time period sufficient to contact the released VOC with the polymer layer; thereby loading the polymer with the VOC.

The agent may be a microorganism. The microorganism may be selected from the group consisting of: a bacteria; a virus; fungi; a prion; or any component or combination thereof. Accordingly, the method may be for training to detect a bacterium. The method may be for training to detect a virus. The method may be for training to detect a toxin or any chemical posing a risk, so long as the toxin or chemical may be reliably deactivated or destroyed by heating without permanently destroying the polymer-infused material used to conduct the training in a render-safe manner.

The agent may be a toxin. The toxin may be selected from the group consisting of: a plant toxin (e.g., ricin, abrin); a bacterial toxin (e.g., botulinum, Shiga); a marine toxin (e.g., saxitoxin); a fungal toxin (e.g., mycotoxin); and a combination thereof. The agent may be a chemical. The inactivating of the toxins and/or chemicals may be by one or more of: autoclaving (steam-heating) and/or filtration.

The method may be for training to detect two or more biohazards, such as a combination of biohazards. This can be accomplished by capturing with a single polymer layer analytes associated with at least two biohazards. Alternatively, a canine can be trained with two or more training aids, where each training aid has analytes from a unique biological material. In these manners, a single canine can detect presence of at least two different biological materials, such as coronavirus or influenza infection in an individual.

The method may be used to train an animal. The method may be used to improve machine detection, including calibration and testing while avoiding use of the actual biohazard itself.

The methods provided herein have a number of other useful benefits. For example, the methods ensure the resultant device can have a very long shelf-life, wherein shelf-life is indicative of the time elapsed since the training aid and wherein the training aid remains useful for reliable training. For example, the lid and canister in a stored configuration can provide a shelf-life for a canine-training application of at least six-months. This is a reflection of the reliable charging of the polymer with VOC and the chemical kinetics of VOCs within the closed canister.

The methods are particularly suited to a biological agent that is a microorganism, such as a microorganism that impacts veterinary health and/or public health. For example, the microorganism may be an animal disease virus, including a foreign animal disease virus of interest to a government agency (e.g., USDA or FDA) such as African swine fever virus, a coronavirus, or an influenza virus.

Also provided herein are render-safe training aids, including aids made by any of the methods described herein.

A render-safe training aid may comprise: a canister having a bottom surface and one or more side walls to define an interior volume with an open upper surface (e.g., bottom surface faces the absent upper surface, and the canister interior can be exposed to the environment. A removable lid is removably connected to the canister by one or more side walls; and a sterilized VOC-infused polymer positioned supported by the canister bottom surface. Of course, as the fundamental platform of the instant technology is the render-safe platform, the training aid is compatible with any number of geometries or configurations, including closeable vents that provide access to the canister interior, thereby avoiding the need for a canister having separate lid and base pieces.

Also provided herein are canine training methods using any of the render-safe training aids described herein, or made by any of the methods described herein.

The training aid may be reusable. For example, reusing of the render-safe training aid may occur over a time period encompassing at least 10 different times for the same canine, a different canine, or a combination of the same and different canines. Multiple uses can be accomplished by simply storing the charged render-safe polymer in a closed canister until the next time the aid is required. This can effectively act to prevent or at least substantially minimize loss of VOCs from the polymer when stored.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

BRIEF DESCRIPTION OF THE DRAWINGS

FIG. 3. Distractor and Target Summary: Relationship and pertinent plasmid comparison between target and distractor strains. Data shown is cross-referenced information between multiple sources to include Bazinet, et al., "Pan-genome and phylogeny of *Bacillus cereus* sensu lato." (Bazinet 2017); Genome Taxonomy Database http://gtdb.ecogenomic.org/; NCBI Genome https://www.ncbi.nlm.nih.gov/genome/; and origin data from publications by Radnedge et al., and Kolsto et al. (Radnedge, Agron et al. 2003, Kolsto, Tourasse et al. 2009).

FIGS. 4A-4B are similar to FIG. 1, but illustrate the method is compatible with a range of inactivation processes to obtain a render-safe training aid. FIG. 4A illustrates the heating of the charged polymer is compatible with other processes that inactivate the charged polymer for a render-safe polymer. FIG. 4B illustrates an inactivating step may occur before the charging, on the biological material itself prior to introduction to the polymer. In this manner, the charged polymer may be directly stored after changing, thereby avoiding inactivation step post-charging. For extra safety, both pre- and a post-inactivation steps, or multiple post-inactivation processes may be used.

DETAILED DESCRIPTION OF THE INVENTION

In general the terms and phrases used herein have their art-recognized meaning, which can be found by reference to standard texts, journal references and contexts known to those skilled in the art. Referring to the drawings, like numerals indicate like elements and the same number appearing in more than one drawing refers to the same element. The following definitions are provided to clarify their specific use in the context of the invention.

As used herein, "biological material" refers to a substance that can impact biological well-being, including a bacteria, virus, fungus, prions, toxins, or related material, including any of those that may be characterized as BSAT and/or of potential risk of generating a disease outbreak impacting public or animal health, including pandemic outbreaks. Particularly relevant are those that can be used as a weapon of mass destruction, are part of a pandemic including SARS-CoV-2 (causative agent of COVID-19), foreign animal diseases (e.g., African swine fever virus), and/or are identified as an emerging threat. The emerging threat can be directly to humans, or to an animal or a plant, including animals or plants of commercial value. The biological material may be in any of a wide variety of forms, including in a cell culture, a cultured layer on a substrate, a suspension in a biological fluid, a tissue sample, or the like. The cell culture may include a biological material that is a microorganism such as a bacteria or a virus, including SARS-CoV-2 or other coronaviruses, African swine fever virus or other foreign animal diseases, or influenza viruses. For viral biological agents, the virus includes those that are capable of infecting a cell culture and releasing odors that can be used to train canines with any of the training aids provided herein. Similarly, the biological agent may correspond to samples obtained from infected individuals (human, animal or plant) that are then exposed to the training aid polymer layer. A "biological agent" may correspond to the "biological material", or it may be different. For example, the polymer may be exposed to a biological material that is a cell culture that contains biological cells infected with a biological agent that is a virus. The biological agent in this context, is viable virus, so that the methods and devices provided herein relate to ensuring any biological agent is inactivated. Similarly, for a bacterial application, the biological material may be a combination of bacteria and another material, such as an organic living material, or any other substance depending on the application of interest, such as soil, dirt, foodstuff, agricultural products, and the like, with the biological agent corresponding to the bacteria.

"Toxin", similar to biological agent, refers to a substance that can have a biological impact but that is not itself capable of reproducing. Instead, it can be produced by a living organism and acts as a poison to another living organism, including humans, animals or plants. A toxin may be generated by a biological material and/or biological agent. A toxin may be synthetically manufactured. Examples of toxins include, but are not limited to, toxic secondary metabolites produced by organisms, such as bacteria, plant, marine organism, a fungus. A toxin may be artificially synthesized, including by organic and/or inorganic synthesis. Plant toxins include, but are not limited to, ricin, abrin. Bacterial toxins include endotoxins and exototoxins, such as botulinum, Shiga. Marine toxins include, but are not limited to, saxitoxin, palytoxin. Fungal toxins include, but are not limited to, mycotoxins such as aflatoxin, citrinin, fumonisins, ochratoxin A, patulin, trichothecenes, zearalenone, and ergot alkaloids such as ergotamine.

As used herein, "analyte" refers to a volatile component associated with the biological material, including a microorganism, toxin or, more generally, chemical, and that can be used to help identify the corresponding biological material, including in combination with other analytes released by the biological material. The analyte may be released by the biological material as a normal part of the metabolic pathway. The analyte may be described as a volatile organic compound (VOC), such as a microbial volatile organic compound (MVOC). The methods and devices are particularly suited as training aids because they have been rendered-safe, and there is no chance of inadvertent unwanted exposure during use, as the only relevant biological material are the VOCs that are not, in and of themselves in the amounts found in the polymer, dangerous to the environment, user, or the public.

A polymer layer is considered in "proximity" to a material, including a biological material, if volatile organic compounds from the material are capable of coming into contact with the polymer material, so that the polymer material becomes charged with the VOC and can be used to later train, including canines. The proximate position is preferably not in physical contact with the biological material. Given the ease by which VOC diffuse or can be conveyed (e.g., via convection and/or diffusion), the proximity of the polymer to the biological material to achieve desired charge of the polymer with the VOC is rather tolerant, and can include separation distances up to 10 cm or greater.

"Air-tight" refers to there being no leakage or communication between the inner volume formed by the canister and lid, and the surrounding environment. Of course, the invention is compatible with some minimal leakage, including being described as "substantially" air-tight. Such leakage is preferred to be minimized, as the VOCs will also tend to leak, thereby decreasing device shelf-life. In this context, "substantially" may refer to air leakage that is selected to have a value such that the shelf-life of the device is on the order of between at least 1-6 months without undue impact on training sensitivity and specificity.

As used herein, "sensitivity" of the training aid indicates the likelihood a canine will be alerted in a training assay.

As used herein, "specificity" of the training aid indicates the likelihood a canine will discriminate the target from a distractor or background VOC.

As used herein, "inactivating" refers to a process that can render-safe the training aid so that there is no concern with respect to how the training aid is handled, stored, transported or used because there is no risk of secondary infection from the training aid. The inactivating is, functionally, equivalent to a sterilization where potentially infectious microorganisms (bacteria, virus) are inactivated. The methods provided herein are compatible with a range of inactivating processes that remove microorganisms or capacity to be infective, including, but not limited to, saturated steam under pressure (e.g., autoclave), hot air, filtration, irradiation (gamma and electron-beam radiation) that do not adversely impact the ability of the polymer to be charged with an odor associated with the biological agent. See, e.g., The International Pharmacopoeia (Ninth Edition, 2019) at 5.8 "Methods of sterilization." Although gas and chemical inactivation are possible, they are preferably avoided as they have a tendency to either add new odor that is unwanted or would compromise the polymer layer (e.g., make it brittle).

The methods and devices presented herein are compatible with a range of materials to capture, store and release VOCs associated with infectious biological material, including BSAT. For example, a silicone elastomer may be used, including polydimethylsiloxane (PDMS).

PDMS is a non-crystalline, hydrophobic polymer suitable for both absorption of VOCs into the polymer and uniform release back into the vapor phase. Canine detection training aids using PDMS are a relatively new technology for the canine community. Unlike previous alternative training aids that have tried to mimic hazardous target odors or render actual hazardous target material safe, the PDMS methods provided herein capture, contain, and then release the actual vapor emitted from a hazardous target. This is safer and obviates custody and logistical complications as compared to distributing, handling, and storing hazardous targets in their native form in security-restricted operational environments, such as a mass transit system or a public space.

PDMS can be polymerized using a two-part base/curing agent mixture and can be cured with either heat or at room temperature. PDMS can be dispensed directly into the canister in which it is cured. PDMS can withstand an operational temperature range of −45° C. to 200° C., which is within the temperature range used to remove VOCs associated with the canister and for the resulting autoclave sterilization process after the target VOCs are added.

Figure 1:
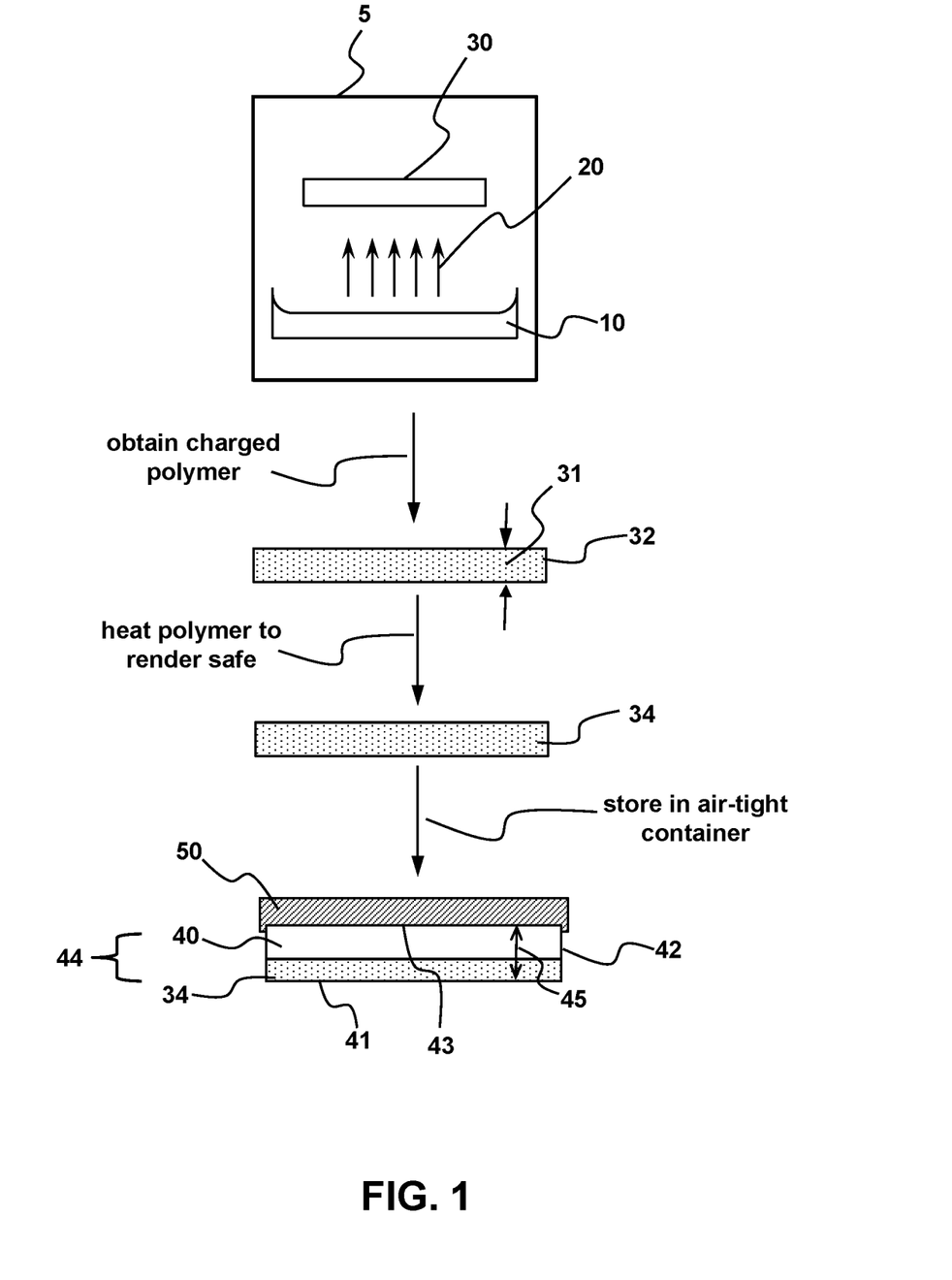
FIG. 1 is a schematic illustration of a method of making a training aid, including a canine training aid.

FIG. 1 is a representative schematic of a method of making a training aid. A biological material 10 emits analytes as indicated by arrows 20. In this example, the biological material 10 is illustrated as cell culture having cell culture media. The cells may be dispersed in the media or may be positioned on a solid substrate at the bottom of the cell culture media. As described, the analytes may be characterized as VOC or MVOC. The analytes diffuse or are otherwise conveyed to polymer 30 positioned proximate to and separated from biological material 10. This "charging" of the material may be carried out in a secure area 5 capable of handling dangerous materials. The charged polymer 32 is then heated to obtain a render-safe polymer 34. The render-safe polymer 34 is also referred herein as a sterilized polymer, reflecting that the heating step ensures there is no active biological material 10 associated with the polymer 34.

The render-safe charged polymer 34 can be stored in an air-tight canister 40 with removable lid 50. The canister 40 may have a bottom surface 41, side wall(s) 42, and open upper surface 43 to form an inner volume illustrated as 44 (corresponding to polymer volume plus the air-space between the polymer surface and the facing lid surface). The canister has a depth, as illustrated by 45, and the polymer a thickness, as illustrated by arrows 31. Canister depth 45 may correspond to length of sidewall(s) 42, such as between about 1 cm and 3 cm, or about 2 cm. Canister may be circular in cross-section, so that there is a single sidewall, with a diameter between about 1 cm and 30 cm, including between 3 cm and 10 cm, or about 6 cm. A circular cross-section canister is preferable, although other shapes are compatible, including squares, rectangles, triangles, ellipses and the like. Smooth edges are preferred over edges having corners for better distribution of VOCs that otherwise may have a tendency to "stick" in the corners.

Figure 4A:
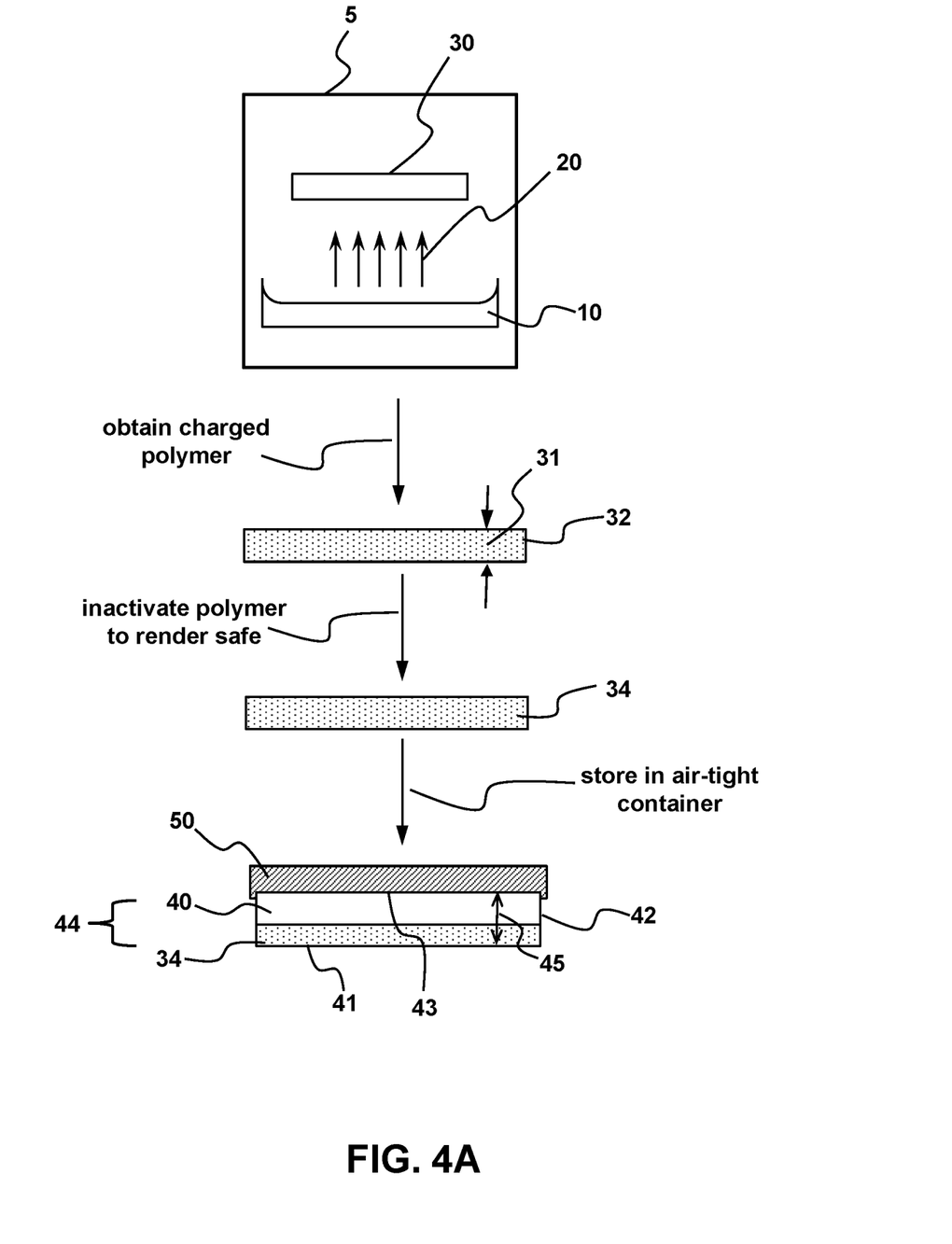

FIG. 4A illustrates a method that uses an inactivating step to obtain render-safe charged polymer 34. The inactivating step may correspond to a heating step as described in FIG. 1 or another post-charged inactivation, such as irradiation or intense light, including exposure to ionizing radiation, UV illumination or other wavelength that can inactivate unwanted biological agents that could cause harm while ensuring the charged polymer remains effective as a training aid.

Figure 4B:
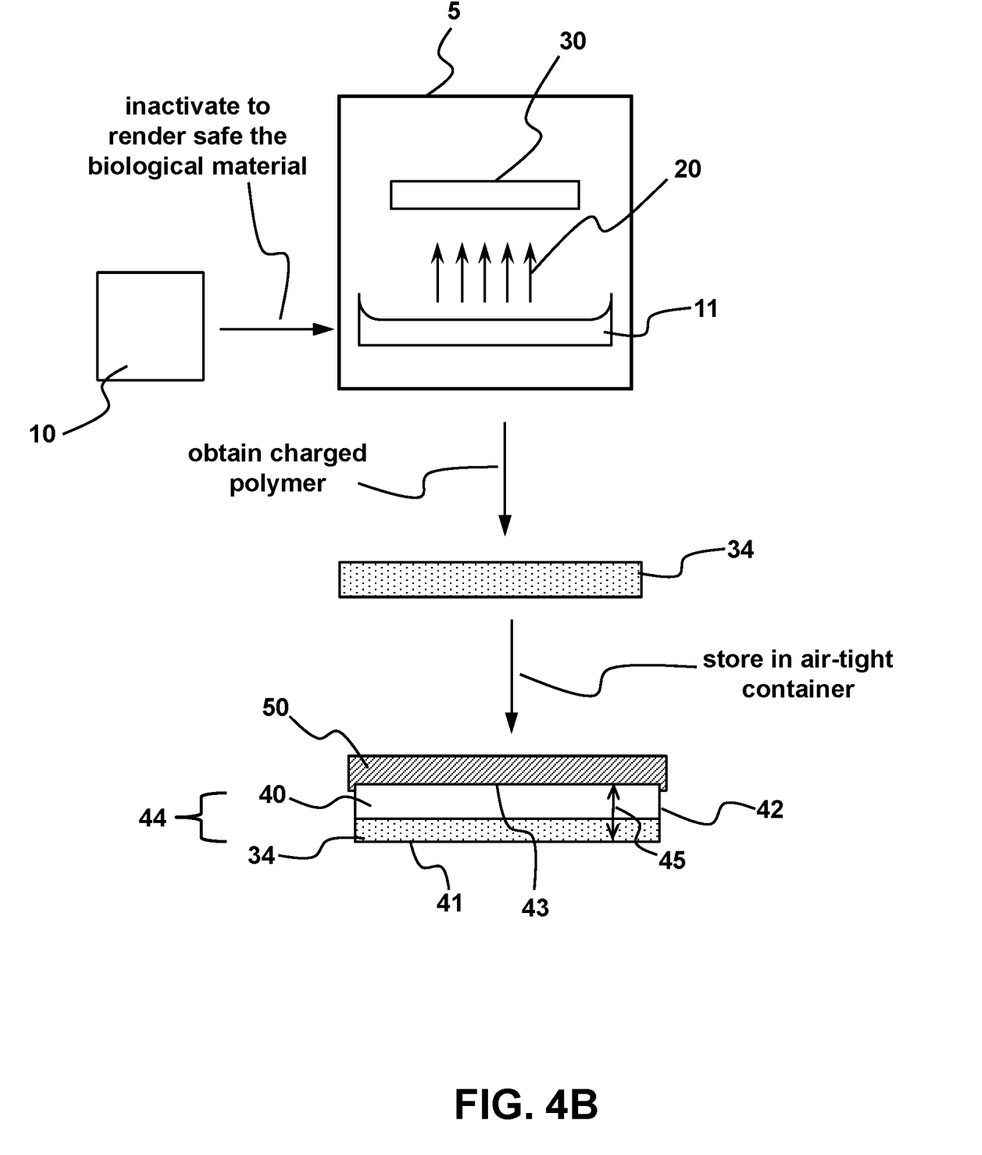

Alternatively, the inactivating may be prior to charging, as illustrated in FIG. 4B. This may be by filtering to remove unwanted dangerous components from the biological material while the odor-releasing components remain to be used for charging. Again, any inactivation that selectively inactivates the dangerous (including infectious) components, without adversely impacting the vapor-releasing components useful for training, can be used. This could include a heating step. The biological material 10 undergoes an inactivation step before charging of polymer layer 30 to obtain a "safe" biological material 11 that is used to charge polymer layer 30. Accordingly, a render-safe charged polymer 34 can be obtained directly from the charging step. As desired, multiple different inactivation steps may be used, including pre and/or post-charging, for extra safety. For example, a combination of filtering, heating, and irradiation may be used.

Figure 2:
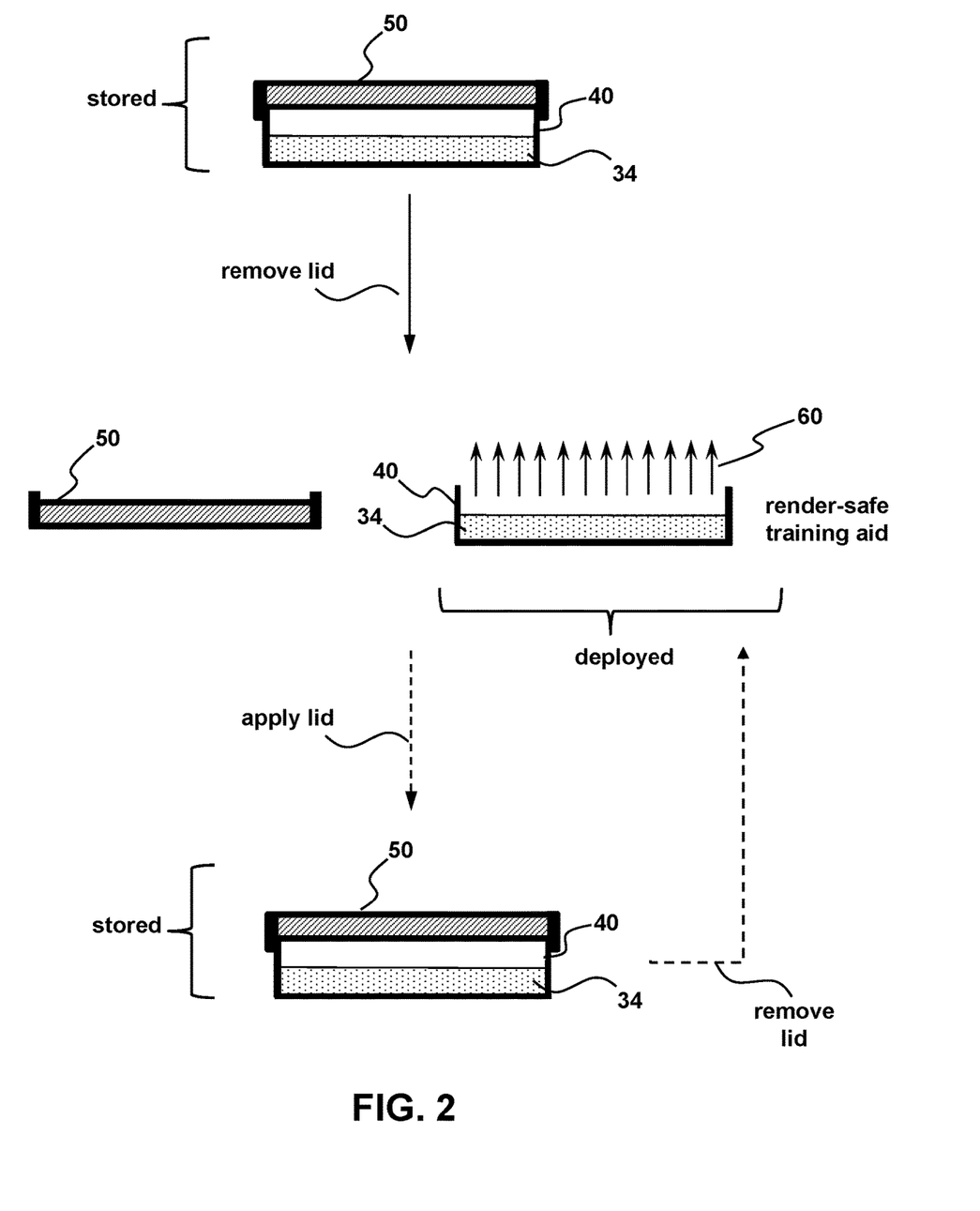
FIG. 2 is a process flow illustration of the details of the training aid, and related training aid stored and deployed configuration. The dashed lines indicate that the training aid is optionally reusable for a number of deployments, wherein between deployed training aid use, the sterilized and VOC-charged (e.g., infused) polymer is positioned in a closed canister.

FIG. 2 illustrates the training aid in a stored (top panel) and deployed (deployed) configuration. To store the aid, the lid 50 is affixed to the bottom portion 40 of the canister, with the charged and sterilized polymer layer contained within the closed volume formed by the lid and bottom canister 40. To use the training aid, the lid 50 is removed, thereby exposing the charged and sterilized polymer to the environment and corresponding release of the captured VOCs 60 to the surrounding environment, for detection by a detector, such as an artificial sensor or an animal (e.g., canine) olfactory system. The dashed lines labeled "apply lid" and "remove lid" reflects that the aid can be re-used, including over relatively lengthy time periods. For applications where there is concern of losing lid 50, the aid may incorporate exposable vents, where there is a one-piece canister and by a twisting or translation motion, motion of one piece exposes or covers vents or a large opening on the top or bottom surface of the canister.

The following examples further illustrate the invention but, of course, should not be construed as in any way limiting its scope.

Example 1: Polymer Odor Capture and Release (POCR) Design—Preparing the PDMS Layer Referring to FIGS. 1-2, this example demonstrates polymer odor capture and release (POCR) design contains the following: a canister 40 with a lid 50, a polydimethylsiloxane (PDMS) membrane 30 32 34, and microbial volatile organic compounds (MVOCs) 20 from a biological agent or toxin 10.

The PDMS can be provided in a canister and lid configuration. The canister and lid are constructed of shallow, seamless, tin plated steel formed from 0.24 mm metal or other material (e.g. glass) able to withstand the sterilization process, such as a pressure and temperature sterilization process associated with autoclaving. The canister and lid can be round and described as having a minimum depth of and a minimum diameter. Examples of a minimum depth and minimum diameter include, but are not limited to, ¾" and 2.5", respectively. The canister and lid preferably do not contain any additional openings in order to contain the target VOCs when not in use. For example, the canister and lid together may form a substantially airtight seal, where there is minimal vapor loss from the sealed canister and lid and minimal air entry into the interior of the canister and lid from the environment surrounding the canister and lid.

In order to remove inherent and unwanted VOCs from the canisters and lids prior to adding the PDMS membrane and target VOCs, a baking procedure is performed. This process removes factory, shipping, curing, and non-target biological odors. With an oven preheated for one hour at 150° C., lids are removed from the canisters and both components are baked at 150° C. for four hours. Once cooled, the lid is placed on the canister and Teflon® tape can be placed around the edge of each lid during storage for an additional seal.

Polydimethylsiloxane Membrane: Commercially available grades of PDMS can be used. For example, SYLGARD™ 184 (Dow Corning SKU 2065622) can be used.

PDMS is prepared according to manufacturer instructions and poured into baked, cooled canisters to a depth of at least 2 mm. SYLGARD™ 184 includes a volatile impurity, ethylbenzene. In order to remove this impurity from the polymeric substrate, the VOCs from this impurity can be removed through a second baking process. Once cured, and with the lids removed, the canisters with PDMS and the lids are baked at 150° C. for two hours. Once cooled, the lid is placed on the canister and Teflon® tape is placed around the edge of each lid for storage.

Example 2: Polymer Odor Capture and Release (POCR) Design—Loading the PDMS Layer Target Biological Agent MVOCs: During metabolism, microorganisms produce MVOCs. PDMS can be infused with MVOCs by suspending the PDMS-containing canister over a biological agent for a period of days to weeks. This indirect method of capturing MVOCs minimizes microbial contamination of the POCR.

Example 3: Polymer Odor Capture and Release (POCR) Design—Sterilizing the PDMS Layer POCRs infused with VOCs are sterilized, such as by autoclaving at 121° C. for 60 minutes. This method of steam sterilization is common practice in microbiological laboratories and is effective at combining four parameters to quickly kill microorganisms: steam, pressure, temperature, and time. After autoclaving, the responsible laboratory conducts daily sterility checks for an agent-specific period of time, typically up to seven days, before a laboratory can confirm the POCRs non-hazardous and non-infectious so that they may be safely shipped and used for canine detection training in the field.

Example 4: Experimental Results

Bovine Viral Diarrheal Virus (BVDV)

Trial design: Five canines are used in all trials described below and detection is performed using a six-arm scent wheel. Distractors include a closely related bovine virus (bovine herpesvirus 1 Colorado strain), prepared cell culture media, and the following components of cell culture media: purified water, minimal essential media with Earle's salts, L-glutamine, an antibiotic combination consisting of penicillin/streptomycin/amphotericin, sodium bicarbonate, and equine serum. Canines are operated off-lead by a handler, who was blinded to the target location.

Autoclaved POCR-BVDV: Canines are presented 57 autoclaved POCR-BVDV targets and 612 distractors. Canines alert to 52 of 57 autoclaved POCR-BVDV targets and alert to 8 of 612 distractor presentations. The sensitivity of canine detection is 91.2% (95% confidence interval [CI], 81.0, 96.2), indicating a high capability to identify the target using the scent wheel. The canines' specificity is 98.7% (95% CI, 99.4, 97.4) indicating a high capability to discriminate the target virus from the distractors (Table 1).

Live BVDV Cell Culture:

Canines are presented 49 live cell cultures of BVDV and 327 distractor presentations. Canines alert to 49 of 49 live BVDV cell culture targets and alert to 1 of 327 distractor presentations. The sensitivity of canine detection is 100% (95% CI, 92.7, 100), indicating a high capability to identify the target. The canines' specificity is 99.7% (95% CI, 98.3, 99.9), indicating they were capable of discriminating the target virus from the distractors (Table 1).

Bacillus anthracis

Trial design: Six canines are used in trials described below and detection is performed using simulated operational searches of buildings or a six-arm scent wheel. Distractors include two strains of Bacillus cereus, two strains of B. thuringiensis, blank nutrient agar plates, and the individual components of the nutrient agar (beef extract, peptone, agar). Blank POCRs are placed throughout the laboratory to absorb other laboratory-associated odors, serving as an additional distractor. Canines are operated off-lead by a handler, who is blinded to the target location.

Figure 3:
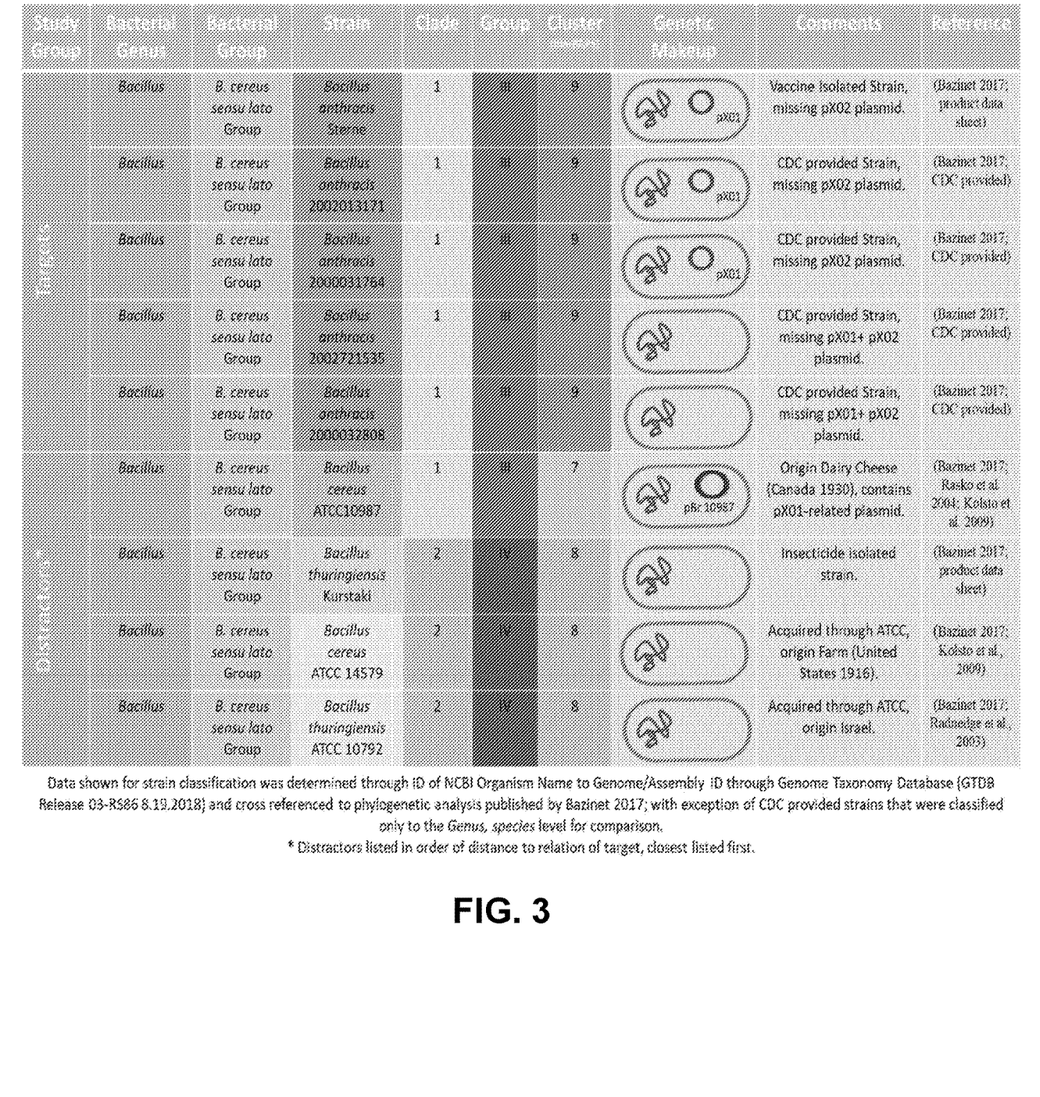

Selection of distractor B. cereus and B. thuringiensis strains: B. anthracis, B. cereus, and B. thuringiensis are closely related species belonging to the Bacillus cereus sensu lato group. Because there is more diversity amongst strains of B. cereus and B. thuringiensis, for each species we select one strain more closely related to B. anthracis and one less related, for a total of four distractor strains. (FIG. 3)

Selection of B. anthracis strains: Five strains of B. anthracis were included: Sterne strain and four cured B. anthracis strains provided by the U.S. CDC (FIG. 3).

Autoclaved POCR-B. anthracis Sterne strain (POCR-BA Sterne):

Canines are presented 120 autoclaved POCR-BA Sterne targets and 220 autoclaved distractor presentations hidden for simulated operational searches of buildings. The purpose of this part of the experiment is to determine if canines could discriminate between B. anthracis and closely related species. As B. cereus is a common microorganism found in soil and B. thuringiensis is a natural biological pesticide used in agriculture, this is also an important operational consideration as canines are likely to encounter both species in their environment on a regular basis. One of the B. thuringiensis strains selected is isolated from Thuricide®, a widely used pesticide in the United States.

Canines alert to 91.7% (95% CI, 85, 95) of autoclaved POCR-BA Sterne targets and alert to 16% (95% CI, 12, 22) of autoclaved distractor presentations. This is an unusually high false positive rate, attributed to the autoclaving process contaminating samples with a native scent that caused targets and distractors to share a common set of odors. This is furthered by the fact that canines have difficulty discriminating all distractors, not just distracting bacteria. Further testing is conducted on a six-arm scent wheel using POCRs containing autoclaved (n=220) and unautoclaved (n=402) distractors. Canines alert to 16% (95% CI, 9, 26) of autoclaved distractors and 3.7% (95% CI, 2.2, 6) of unautoclaved distractors. To mitigate the high false positive rate, new and dedicated autoclaves for distractors may be utilized.

With a sensitivity of 91.7% (95% CI, 85, 95), canine detection results indicate a high capability to identify the target in an operational environment. The canines' specificity on unautoclaved distractors is also high, indicating a high capability to discriminate the target virus from the distractors, including other strains of Bacillus spp.

Live Bacillus anthracis Cultures: A six-arm scent wheel is used to determine whether canines trained on POCR-BA Sterne are able to generalize to four cured strains of B. anthracis. Canines are presented 332 live BA cultures. Canines give a positive indication on 91.2% (95% CI, 87, 93) of all five of the BA targets. Also noteworthy, canines give a positive indication 91.6% (95% CI, 74, 97) the very first time they experienced the four new cured BA targets (n=24), indicating the canines are able to generalize from BA Sterne to other BA strains. Canines give a false indication on 0.4% (95% CI, 0.1, 1) of live distractors (n=996) during trials that had a positive target present. Canines give a false indication on 3.7% (95% CI, 2, 4) of distractors (n=1482) during trials during which a target is not present.

Example 5: SARS-CoV-2 (Causative Agent of COVID-19)

An example of use of the training aid for detection of an emerging threat is for detection of a biological agent that is causing or likely to cause a pandemic, including a coronavirus such as the one that causes COVID-19. Exemplary methods include culturing cells capable of being infected by the virus known as severe acute respiratory syndrome coronavirus 2 (SARS-CoV-2) that causes the coronavirus disease 2019 (COVID-19). For example, the virus has been cultured with Vero-CCL81 cells and Vero E6 cells. Harcourt J, et al. *Severe Acute Respiratory Syndrome Coronavirus 2 from Patient with Coronavirus Disease*, United States. Emerg Infect Dis. 2020; 26(6):1266-1273. https://dx.doi.org/10.3201/eid2606.200516. Other cell lines include a human-derived cell line, such as Huh7 cells. The polymer layer may be exposed directly to the cell culture or may be exposed to cell culture media removed from the cell culture, thereby capturing one or more analytes and obtaining an analyte-infused polymer layer associated with SARS-CoV-2. The removed cell culture material may be filtered prior to exposure to the polymer layer. The analyte-infused polymer layer may be subject to inactivation, including by steam heating under pressure, to ensure the training aid is rendered safe for subsequent use. The render-safe analyte-infused polymer layer is then stored in a substantially air-tight canister with a removable lid for subsequent use in training.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

LIST OF TABLES

TABLE 1

Comparison of canine detection of autoclaved BVDV targets versus live BVDV targets. Canines are presented 57 autoclaved POCR-BVDV targets and 612 distractor presentations. Canines alert to 52 of 57 autoclaved POCR-BVDV targets and alert to 8 of 612 distractor presentations. The sensitivity of canine detection is 91.2% (95% confidence interval [CI], 81.0, 96.2), indicating a high capability to identify the target using the scent wheel. The canines' specificity is 98.7% (95% CI, 99.4, 97.4), indicating a high capability to discriminate the target virus from the distractors

|  | Autoclaved POCR-BVDV | Live BVDV culture (high infection) |
|---|---|---|
| # Targets | 57 | 49 |
| # Target alerts | 52 | 49 |
| # Distractors | 612 | 327 |
| # Distractor alerts | 8 | 1 |
| Sensitivity | 91.2% (95% CI, 81.0, 96.2) | 100% (95% CI, 92.7, 100) |
| Specificity | 98.7% (95% CI, 99.4, 97.4) | 99.7% (95% CI, 98.3, 99.9) |

The invention claimed is:

1. A method of training a canine to detect a biological material, the method comprising:
   providing a training aid comprising:
      a canister having a bottom surface and one or more side walls to define an interior volume with an open side;
      a sterilized volatile organic compound (VOC)-infused polymer positioned in the canister interior volume, wherein the sterilized VOC-infused polymer is made by:
         forming a VOC-infused polymer by positioning a polymer in proximity and physically separated from the biological material that releases VOCs, wherein the VOCs release from the biological material and then contact and are captured by the polymer; and
         inactivating any biological agents on or in the VOC-infused polymer that were captured from the biological material to sterilize the VOC-infused polymer without adversely impacting VOC detection so that the VOCs can be detected without harm; and a removable lid removably connected to the canister to cover the canister open side and contain the sterilized VOC-infused polymer in the canister interior volume;

removing the removable lid from the canister; and exposing the canine to the sterilized VOC-infused polymer in the canister and thus to the VOCs that were captured from the biological material.

2. The method of claim 1, wherein the training aid is reusable, the method further comprising:

reusing the training aid at least 10 times for the same canine or a different canine.

3. A render-safe canine training aid, comprising:

a canister having a bottom surface and one or more side walls to define an interior volume with an open side;

a removable lid removably connected to the canister to cover the canister open side to enclose the canister interior volume; and a sterilized volatile organic compound (VOC)-infused polymer positioned in the canister interior volume, wherein the sterilized VOC-infused polymer includes:

a polymer;

VOCs released from a biological material in proximity and physically separated from the polymer, and captured by the polymer; and biological agents released from the biological material in proximity and physically separated from the polymer, captured by the polymer, and inactivated to sterilize the biological agents without adversely impacting VOC detection so that the VOCs can be detected without harm, wherein in use a canine is exposed to the sterilized VOC-infused polymer and thus to the VOCs that were captured from the biological material to train the canine to detect the biological material without being harmed by the biological agents.

4. The training aid of claim 3, wherein the polymer, the canister, or both are heated, before the VOCs and the biological agents are captured by the polymer, to remove unwanted VOCs associated with the polymer, the canister, or both.

5. The training aid of claim 4, wherein the polymer is heated, before the VOCs and the biological agents are captured by the polymer, to at least 125° C. for at least one hour to remove unwanted polymer impurities.

6. The training aid of claim 4, wherein the canister and lid are heated, before the VOCs and the biological agents are captured by the polymer, to a temperature between 140° C.-160° C. for at least three hours.

7. The training aid of claim 3, wherein the biological agents are inactivated after the VOCs and the biological agents are captured by the polymer.

8. The training aid of claim 3, wherein the biological agents are inactivated by heating the VOCs and the biological agents to a temperature between 125° C. and 155° C. for a time period of between 0.5 hours and 1.5 hours.

9. The training aid of claim 3, wherein the biological agents are inactivated by steam heating, dry heating, irradiating with electromagnetic radiation, or filtering the VOCs and the biological agents.

10. The training aid of claim 3, wherein in use, after the biological agents are inactivated, the training aid has a VOC sensitivity of at least 85%, a VOC specificity of at least 90%, or both.

11. The training aid of claim 3, wherein the removable lid is configured to cover the canister inner volume to contain the sterilized VOC-infused polymer in a substantially air-tight configuration.

12. The training aid of claim 3, wherein the polymer comprises polydimethylsiloxane (PDMS).

13. The training aid of claim 3, wherein the biological agent is a microorganism selected from the group consisting of a bacteria, a virus, a fungus, a prion, and a combination thereof; a toxin selected from the group consisting of a plant toxin, a bacterial toxin, a marine toxin, a fungal toxin, and a combination thereof; or both the microorganism and the toxin.

14. A render-safe canine training aid, comprising:

a canister having a bottom surface and one or more side walls to define an interior volume with an open side;

a removable lid removably connected to the canister to cover the canister open side to enclose the canister interior volume in a substantially air-tight configuration; and a sterilized volatile organic compound (VOC)-infused polymer positioned in the canister interior volume, wherein the sterilized VOC-infused polymer includes:

a polymer;

VOCs released from a biological material in proximity and physically separated from the polymer, and captured by the polymer; and biological agents released from the biological material in proximity and physically separated from the polymer, captured by the polymer, and inactivated to sterilize the biological agents while maintaining a VOC sensitivity of at least 85%, a VOC specificity of at least 90%, or both, so that the VOCs can be detected without harm, wherein the polymer, the canister, or both are heated, before the VOCs and the biological agents are captured by the polymer, to remove unwanted VOCs associated with the polymer, the canister, or both, and wherein in use a canine is exposed to the sterilized VOC-infused polymer and thus to the VOCs that were captured from the biological material to train the canine to detect the biological material without being harmed by the biological agents.

15. The training aid of claim 14, wherein the polymer is heated, before the VOCs and the biological agents are captured by the polymer, to at least 125° C. for at least one hour to remove unwanted polymer impurities, or the canister and lid are heated, before the VOCs and the biological agents are captured by the polymer, to a temperature between 140° C.-160° C. for at least three hours.

16. The training aid of claim 14, wherein the biological agents are inactivated after the VOCs and the biological agents are captured by the polymer.

17. The method of claim 1, wherein the polymer, the canister, or both are heated, before the VOCs and the biological agents are captured by the polymer, to remove unwanted VOCs associated with the polymer, the canister, or both.

18. The method of claim 17, wherein the polymer is heated, before the VOCs and the biological agents are captured by the polymer, to at least 125° C. for at least one hour to remove unwanted polymer impurities.

19. The method of claim 17, wherein the canister and lid are heated, before the VOCs and the biological agents are captured by the polymer, to a temperature between 140° C.-160° C. for at least three hours.

20. The method of claim 1, wherein the biological agents are inactivated after the VOCs and the biological agents are captured by the polymer.

\* \* \* \* \*